US007916708B2

(12) United States Patent
Hart (10) Patent No.: US 7,916,708 B2
(45) Date of Patent: *Mar. 29, 2011

(54) AUTOMATIC PARTITIONING OF WIRELESS ACCESS POINTS INTO OVERLAY AND UNDERLAY NETWORKS

(75) Inventor: Brian Donald Hart, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/501,549

(22) Filed: Jul. 13, 2009

(65) Prior Publication Data

US 2009/0274136 A1 Nov. 5, 2009

Related U.S. Application Data

(63) Continuation of application No. 11/226,630, filed on Sep. 14, 2005, now Pat. No. 7,580,399.

(51) Int. Cl.
*H04W 4/00* (2009.01)
*H04W 40/00* (2009.01)
*H04H 20/67* (2008.01)

(52) U.S. Cl. .................. 370/338; 370/339; 455/446

(58) Field of Classification Search .................. None
See application file for complete search history.

(56) References Cited

U.S. PATENT DOCUMENTS

| | | | | |
|---|---|---|---|---|
| 6,850,511 | B2 * | 2/2005 | Kats et al. | 370/338 |
| 7,162,250 | B2 * | 1/2007 | Misra | 455/453 |
| 2006/0239207 | A1 * | 10/2006 | Naghian | 370/254 |
| 2006/0268791 | A1 * | 11/2006 | Cheng et al. | 370/338 |

OTHER PUBLICATIONS

EP Application No. 06 814 374.2-2412, Communication pursuant to Article 94(3) EPC, Nov. 19, 2008.

(Continued)

*Primary Examiner* — Daniel J Ryman
*Assistant Examiner* — Cassandra Decker
(74) *Attorney, Agent, or Firm* — Baker Botts L.L.P.

(57) ABSTRACT

Methods, apparatuses and systems directed to partitioning access points into two or more network access layers, such as overlay and underlay network access layers. According to one implementation of the present invention, a wireless network management system partitions a set of wireless access points into an overlay network for low-functionality clients and an underlay network for high-functionality clients. As described in further detail below, each of the overlay and underlay networks provides a class of network service, where each class of network service differs relative to at least one attribute (e.g., type of 802.11 access, data rates, High-Density, Quality-of-Service, encryption, compression, etc.). For didactic purposes, the overlay network is also referred to as the overlay network service layer (NSL) and the underlay network is referred to as the underlay NSL. In one implementation of the present invention, a partitioning algorithm is used to partition wireless access points into overlay and underlay networks. As described in further detail below, the partitioning algorithm, in one implementation, automatically assigns access points to the overlay and underlay networks based on the coverage needs of each network and the coverage parameters of each access point. In one implementation, the partitioning algorithm can be configured such that the overlay network provides maximum coverage for low-functionality clients, and the underlay network enables maximum performance for high-functionality clients.

29 Claims, 8 Drawing Sheets

OTHER PUBLICATIONS

Notification Concerning Transmittal of International Preliminary Report on Patentability (Chapter 1 of the Patent Cooperation Treaty)—Written Opinion of the International Searching Authority, dated Mar. 18, 2008, PCT/US2006/035099.

Vieira et al., Topology Design for Service Overlay Networks with Bandwidth Guarantees, IEEE IWQoS, 2004.

Jacquet, Arnaud et al., "A path-aware rate policer: design and comparative evaluation," *BT Technical Report TR-CXR9-2005-006*, downloaded http://bobbriscoe.net/projects/2020comms/retb/policer-nsdi06.pdf on Nov. 8, 2010.

* cited by examiner

AUTOMATIC PARTITIONING OF WIRELESS ACCESS POINTS INTO OVERLAY AND UNDERLAY NETWORKS

CROSS-REFERENCE TO RELATED APPLICATIONS AND PATENTS

This application is a continuation of U.S. application Ser. No. 11/226,630 filed Sep. 14, 2005 now U.S. Pat. No. 7,580, 399 and entitled "Automatic Partitioning of Wireless Access Points Into Overlay and Underlay Networks".

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses and systems directed to partitioning wireless access points into overlay and underlay networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. As enterprises and other entities increasingly rely on wireless networks, the proper deployment and configuration of wireless access points in a wireless network environment becomes critical to performance and security.

The wireless clients or mobile stations that access wireless networks can vary significantly relative to their functionality and capabilities. For example, many types of computing devices now include wireless network interfaces, such as laptops, personal digital assistants, cellular phones, printers, etc. Given the wide variety of wireless clients and the rapid advancement of wireless technology in general, the wireless clients serviced by a wireless network at any given time will span a wide variety of access modes and capabilities. For example, WLAN clients may support IEEE 802.11b WLAN access, while other wireless clients support the 802.11g standard, which features faster data rates. Of course, there may also be a variety of other functional differences between wireless clients (e.g., mixed-mode 11n vs. greenfield 11n, devices capable of adjusting one or more of transmit power, receiver sensitivity, and Clear-Channel-Assessment sensitivity (High-Density-capable) vs. HD-incapable devices, or low-velocity vs. high-velocity). This wide range of capabilities poses certain problems. For example, one problem is that the presence of low-functionality wireless clients may impair the ability of high-functionality clients to operate at maximum performance, because the operational parameters of the wireless network must be downgraded to operate with the lowest common denominator in order to provide service to all clients. This can prevent higher functionality clients from taking advantage of their higher capabilities and therefore reduces performance of the wireless network.

Accordingly, it is sometimes desirable to deploy two independent networks: a lowest-common denominator or overlay network, and a high-functionality or underlay network. It is assumed that all wireless clients can use the overlay network if need be, but that the higher-functionality clients will preferentially select the underlay network wherever possible. Partitioning of wireless access points into overlay and underlay networks, however, can be quite complicated. Desirably, a network administrator should partition the wireless access points in a manner that provides high-functionality clients with higher levels of network service, but does not unduly sacrifice radio frequency (RF) coverage across the different layers of network access. Furthermore, given the dynamic nature of RF environments, this partitioning task may require frequent adjustments to achieve desired performance levels.

In light of the foregoing, a need in the art exists for methods, apparatuses, and systems that facilitate the partitioning of wireless access points into overlay and underlay networks. Embodiments of the present invention substantially fulfill this need.

DESCRIPTION OF THE DRAWINGS

FIG. 2 is a diagram illustrating an exemplary floor plan of a building 400, illustrating exemplary radio frequency (RF) coverage patterns of selected wireless access points (APs) in accordance with one implementation of the present invention.

FIGS. 4a and 4b, together, illustrate the process flow, according to one implementation of the present invention, associated with partitioning APs into overlay and underlay networks.

FIG. 5 illustrates an adjusted coverage pattern for an exemplary AP in accordance with one implementation of the present invention.

FIG. 6 illustrates an exemplary minimum required signal level (MRSL) map in accordance with one implementation of the present invention.

DESCRIPTION OF PREFERRED EMBODIMENT(S)

A. Overview

The present invention provides methods, apparatuses and systems directed to partitioning access points into two or more network access layers, such as overlay and underlay network access layers. According to one implementation of the present invention, a wireless network management system partitions a set of wireless access points into an overlay network for low-functionality clients and an underlay network for high-functionality clients. As described in further detail below, each of the overlay and underlay networks provides a class of network service, where each class of network service differs relative to at least one attribute (e.g., type of 802.11 access, data rates, High-Density capability, Quality-of-Service requirements, encryption, compression, etc.). For didactic purposes, the overlay network is also referred to as the overlay network service layer (NSL) and the underlay network is referred to as the underlay NSL. In one implementation of the present invention, a partitioning algorithm is used to partition wireless access points into overlay and underlay networks. As described in further detail below, the partitioning algorithm, in one implementation, automatically assigns access points to the overlay and underlay networks based on the coverage needs of each network and the coverage parameters of each access point. In one implementation, the partitioning algorithm can be configured such that the overlay network provides maximum coverage for low-functionality clients, and the underlay network enables maximum performance for high-functionality clients.

B. Exemplary Wireless Network System Architecture

B.1. Network Topology

Figure 1:
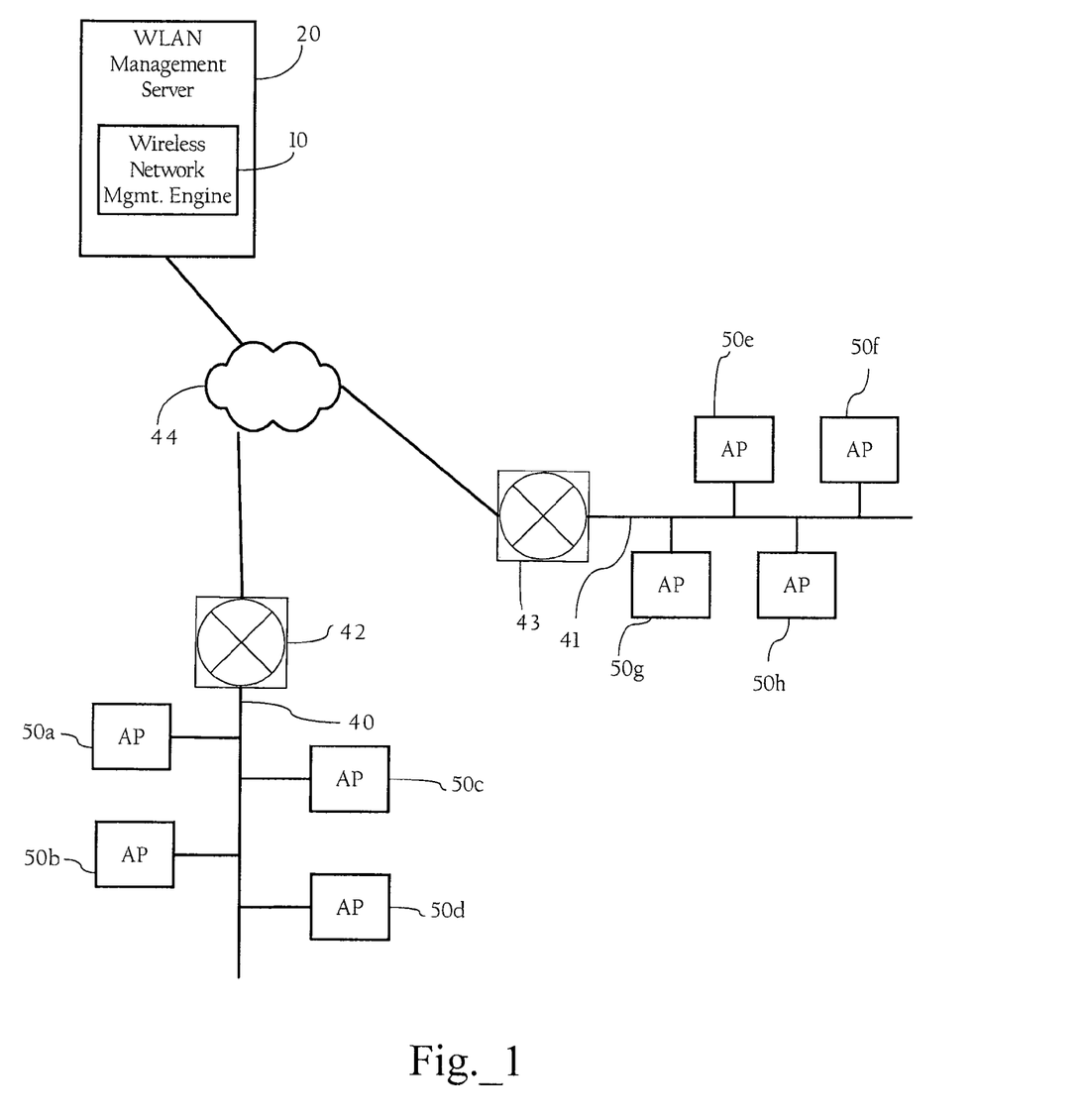
FIG. 1 is a simplified block diagram of the components in a wireless local area network system according to one embodiment of the present invention.

A wireless local area network (WLAN) system according to one implementation of the present invention is shown in FIG. 1. In a specific embodiment of the present invention, the system 100 includes a wireless network management engine 10, running on a WLAN management server 20, local area networks (LANs) 40 and 41, respective network routers 42 and 43, and access points (APs) 50a, 50b, 50c, 50d, 50e, 50f, 50g, and 50h (collectively referred to as APs 50). As FIG. 1 illustrates, these network elements are operably connected to a network 44. Network 44, in one implementation, generally refers to a computer network, such as a LAN, a WAN, etc., that includes one or more intermediate network devices (e.g., routers, switches, etc.), which allow for the transmission of messages between WLAN management server 20 and APs 50. Of course, network 44 can include a variety of network segments, transmission technologies and components, such as terrestrial WAN links, satellite links, and cellular links. LANs 40 and 41 may be LANs or LAN segments implemented by an Ethernet switch (not shown) or an array of switches having multiple ports to which APs 50 are connected. The APs 50 are typically connected to the switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with APs 50.

The APs 50 are operative to wirelessly communicate with remote wireless client devices. In one implementation, the APs 50 implement the wireless network protocol specified in the IEEE 802.11 WLAN specification. The APs 50 may be autonomous or so-called "fat" APs, or light-weight APs operating in connection with a wireless switch (not illustrated), as disclosed in U.S. patent application Ser. No. 10/407,584, now U.S. Pat. No. 7,212,837. Furthermore, U.S. patent application Ser. No. 11/195,536 discloses methods and systems for registering the APs 50 with the wireless network management engine 10. Of course, required configuration and management information can be obtained in a variety of manners without departing from the scope of the present invention.

B.2. Network Service Classes

FIG. 2 is a diagram illustrating an exemplary floor plan of a building 400, including exemplary radio frequency (RF) coverage patterns of selected APs in accordance with one implementation of the present invention. As FIG. 2 shows, APs 50 are positioned in various locations inside building 400. Each AP 50 provides a certain coverage range out to a threshold signal strength (shown as a circle). For ease of illustration, the coverage ranges of selected APs are shown as being circular; however, the coverage ranges will often take arbitrary shapes that depend on the location, nature and number of physical obstructions in the environment. Furthermore, the number of APs illustrated in FIG. 2 are merely for illustrative purposes. The actual number of APs will depend on the specific implementation. As indicated above, the wireless network management engine 10 partitions some of the APs for low-functionality clients into a low-functionality or overlay network, and partitions another set of APs for high-functionality clients into a high-functionality or underlay network. Each of the overlay and underlay networks provides a network service class (NSL) where the network services classes differ from each other in at least one attribute. For example, the overlay network may provide low-functionality services (e.g., low data rate, 802.11b transmission mode, etc.), and the underlay network may provide high-functionality services (e.g., 802.11g transmission mode; higher data rates, etc.). Referring to FIG. 1, any of the APs 50, regardless of their respective physical networks 42 and 43, may function as a part of the overlay network or the underlay network. As such, the operating parameters of the APs associated with the overlay network are configured for low-functionality services and the operating parameters of the APs associated with the underlay network are configured for high-functionality services.

The overlay network preferably provides full coverage, which is desirable for low-functionality clients. In some implementations, all wireless clients can use the overlay network if needed, but the high-functionality devices will preferentially select the underlay network wherever possible since the underlay network provides high-functionality services. Because the overlay and underlay networks are separate and independent, the performance of the underlay network is not compromised, since the underlay network need not accommodate low-functionality wireless clients. As a result, the performance of the underlay network can be optimized for high-functionality devices.

B.3. Coverage Maps

As described above, each AP 50 provides a certain coverage range as FIG. 2 illustrates. As described in further detail below, the RF coverage range of each AP may be presented in an RF coverage map or heat map. RF coverage maps are known and are typically derived from a manual site survey, RF prediction, or a combination of both site surveys and RF prediction. In one implementation, the x- and y-coordinates corresponding to the location of the AP (and, in some implementations, the angular orientation of the AP antenna as specified by the user) are added to a configuration database. With the location of the AP within the area map, and in some implementations, other AP properties, such as antenna type, antenna orientation, radio type (e.g., 802.11a, 802.11b/g, etc.), the wireless network management engine 10 may then compute an RF coverage map for a given AP. That is, using an RF prediction tool, the wireless network management engine 10 may process a vector model of the area map to obtain a model of RF signal propagation characteristics from the defined AP location within the region corresponding to the RF coverage map. The wireless network management engine 10 may generate RF coverage maps for all or a subset of the APs in a wireless network.

RF prediction uses mathematical techniques such as ray tracing to model the effects of physical obstructions such as walls, doors, windows, and the like, on RF signal propagation in a desired environment. For example, S. Fortune, "Algorithms for Prediction of Indoor Radio Propagation," Technical Memorandum, Bell Laboratories (1998), discloses various algorithms that can be used to predict radio signal propagation. Valenzuela et al., "Indoor Propagation Prediction Accuracy and Speed Versus Number of Reflections in Image-Based 3-D Ray-Tracing," Technical Document, Bell Laboratories (1998), describe algorithms for modeling RF signal propagation in indoor environments. In addition, Rajkumar et al., "Predicting RF Coverage in Large Environments using Ray-Beam Tracing and Partitioning Tree Represented Geometry," Technical Document, AT&T Bell Laboratories (1995), also disclose methods for predicting RF signal propagation in site specific environments.

The RF coverage maps are stored in a database, and as discussed in more detail below can be used to partition the APs into overlay and underlay networks. In one implementation, for each AP, the RF coverage map characterizes the expected signal strength at a given location. In one implementation, for each AP, an RF coverage map is maintained that includes the signal strengths in an N×M matrix, where N is the number of x-coordinates in the RF coverage map, and M is the number of y-coordinates in the RF coverage map. For example, in one implementation, the RF physical model comprises a RF coverage map or matrix that indicates the expected receive signal strength at given locations defined in x- and y-coordinates. In one implementation, the extent of the physical space modeled by the RF coverage maps for each AP is co-extensive with building 400. In other implementations, the RF coverage maps for all APs can be co-extensive with a boundary configured by a network administrator, or can be determined by a signal strength threshold. In addition, the RF coverage map database can be populated in a variety of alternative ways. The RF coverage maps can be populated with the results of an extensive site survey, according to which a wireless transceiver is manually placed at different locations in the physical space to observe the signals transmitted by the access points.

Figure 3:
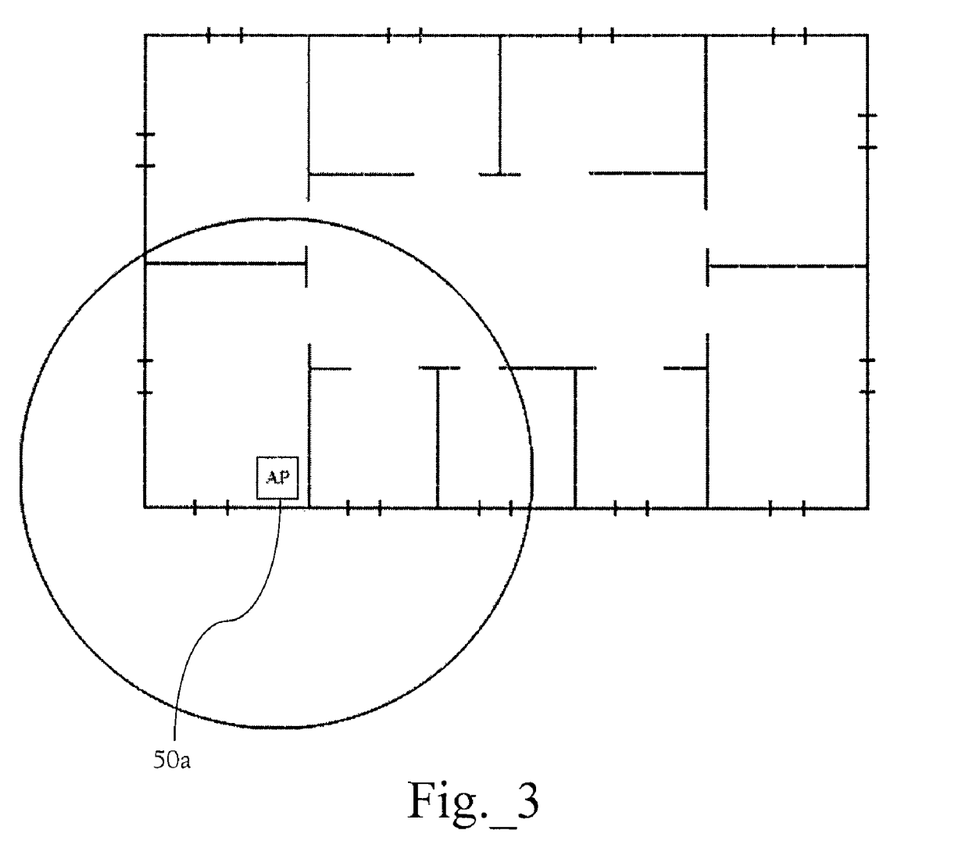
FIG. 3 illustrates an exemplary RF coverage pattern for an AP.

As discussed above, an RF coverage map can be generated for each AP 50. FIG. 3 illustrates an exemplary RF coverage map for an AP (e.g., AP 50*a*), including a plurality of location bins (i.e., square regions within the physical space). Each location bin (shown as a square on a grid) is an area in the coverage area (shown as a region inside the boundaries of the building) that has predetermined dimensions (e.g., 4'×4'). In addition, FIG. 3 also includes a circle that illustrates the locations within the physical region at which the expected receive signal strength equals a minimum signal strength level. As described further below, each of the RF coverage maps are used by a partitioning algorithm to partition APs into either the overlay network or the underlay network.

C. Partitioning Algorithm

In one implementation, the wireless network management engine 10 executes a partitioning algorithm, which partitions the available APs 50 into either the overlay network or the underlay network. The partitioning process maximizes the overall coverage and throughput on both networks with at least the two following objectives. First, where a location or walk-about point (WAP) is only covered by one AP, this AP should be allocated to the overlay network so that RF coverage is maintained for both low- and high-functionality devices. Second, at every WAP, the ratio of overlay to underlay APs should follow approximately a defined ratio of $\rho:(1-\rho)$. The term "$\rho$" is used for didactic purposes and is an overlay proportion, where the desired ratio of overlay APs to underlay APs equals $\rho:(1-\rho)$. Alternatively, $\rho$ is a value between 0 and 1, where the ratio of high-functionality clients to low-functionality "activity-weighted" clients equals $\rho:(1-\rho)$. The exact value of $\rho$ and how it is configured is not critical to the present invention. Given $\rho$, the partitioning algorithm attempts to allocate the number of APs to each NSL according to the ratio $\rho:(1-\rho)$. Of course, in implementations involving more than two NSLs, a proportion or relative share of the APs should be expressed for each NSL.

Figure 4A:
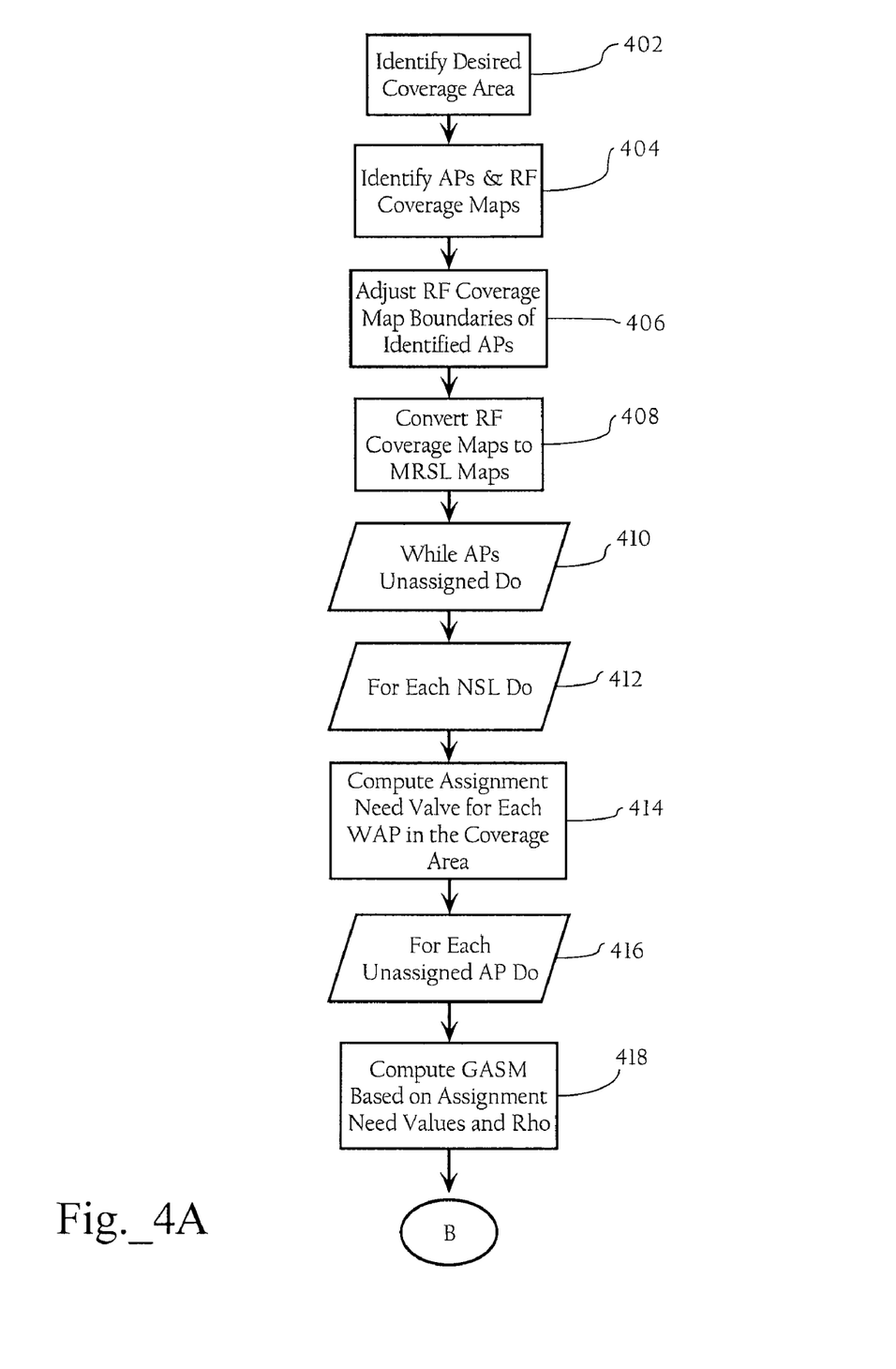

FIGS. 4*a* and 4*b*, together, illustrate the process flow, according to one implementation of the present invention, associated with partitioning APs into overlay and underlay networks. As FIGS. 4*a* and 4*b* illustrate, the wireless network management engine 10 identifies a desired coverage area (402) and identifies the APs in the coverage area and RF coverage maps associated with those APs (404). The wireless network management engine 10 receives the location of each AP and may receive other information such as identity information of each AP, including configuration and operational parameters, as well as an overlay proportion ($\rho$). Known processes such as those described above are used to generate the RF coverage maps.

The wireless network management engine 10 adjusts the RF coverage map of each AP by cropping the boundaries of the RF coverage maps (406) to conform to the physical bounds of the building, which may be predetermined. FIG. 5 illustrates such an adjustment for one exemplary AP 50*a*, where the boundary of its RF coverage map is cropped to conform to the physical bounds of the building.

The wireless network management engine 10 then converts the RF coverage maps to minimum required signal level (MRSL) maps (408), which are binary representations of the coverage range for a given AP. The MRSL is a configurable parameter that sets a minimum threshold signal level assuring adequate coverage at a given location. Similar to a coverage map that indicates the expected receive signal strength at one or more locations in a region, a MRSL map indicates whether the receive signal strength at a given location meets or exceeds the MRSL. FIG. 6 illustrates an exemplary MRSL map, where the RF coverage map for AP 50*a* of FIG. 5 has been converted to an MRSL map. As FIG. 6 illustrates, the WAP may have an associated binary value (e.g., marked "x" if within the coverage range or having no mark if not within the coverage range).

Generally, while there are still unassigned APs, the wireless network management engine 10 applies an algorithm that assigns each unassigned AP to a network service layer (NSL) (410). More specifically, for each NSL (412), the wireless network management engine 10 computes an assignment need value (ANV) for each WAP in the coverage area (414). For example, in the case of an overlay and underlay network implementation (i.e., two NSLs), wireless network management engine 10 computes two ANVs for each WAP, one ANV for the overlay NSL and one ANV for the underlay NSL.

An ANV is a value that represents the need to assign at least one AP to a given WAP in a given NSL. A given WAP will have a higher ANV for a given NSL if fewer APs have been assigned to it, and will have a lower ANV for a given NSL if more APs have been assigned to it. A WAP having a high ANV for the overlay NSL (e.g., $ANV_{o,wap}$=100) and a low ANV for the underlay NSL (e.g., $ANV_{u,wap}$=1) indicates a higher need to have an AP assigned to the overlay NSL to cover that given WAP.

For each unassigned AP (416), the wireless network management engine 10 then computes a greedy algorithm selection metric (GASM) based on the respective ANVs and the predetermined overlay proportion (ρ) (418). The wireless network management engine 10 may compute the GASM, for example, based on the number of WAPs, and their corresponding ANVs, that a given APs can cover (as defined by a corresponding MRSL). Since the wireless network management engine 10 computes an ANV for each WAP and each NSL, it also computes a GASM for each NSL. For example, a given AP may have a GASM of 100 for the overlay NSL and a GASM of 1 for the underlay NSL. After all GASMs have been computed, the wireless network management engine 10 then ranks by GASM all APs across all NSLs (420) and assigns the AP with the highest GASM to the corresponding NSL (422). As FIGS. 4A and 4B illustrate, the wireless network management engine 10 repeats this process until all APs are assigned.

After the APs have been assigned to a network service layer, the wireless network management engine 10 can then perform other configuration operations, such as computing transmit power and channel assignments for the APs. The wireless network management engine 10 may then transmit the configuration information to the APs using conventional mechanisms. Still further, the wireless network management engine 10 may repeat this AP assignment process in response to a variety of conditions or circumstances. For example, the wireless network management engine 10 may be configured to perform the assignment process in response to a detected change, such as the addition of an access point to the wireless network system, the receipt of an explicit command, or a detected change in the RF signal propagation corresponding to one or more APs.

C.1. Assignment Need Value

The following describes how the wireless network management engine 10 computes, according to one implementation of the invention, an assignment need value (ANV) for each location (WAP) in the coverage area and for each network service layer (NSL). In one implementation, the assignment need value ($ANV_{n,wap}$) at a given location for a given NSL(n) is computed according to the following relationship:

$$ANV_{n,wap} = 1/\max(M_{n,wap}, \epsilon_n), \text{ where}$$

$M_{n,wap}$ equals the number of managed APs assigned to a network service layer (n) whose minimum required signal level (MRSL) region covers a given location (wap); and $\epsilon_n$ is a network-service-layer-dependent scalar that satisfies $0 < \epsilon_n < 1$.

As one skilled in the art will recognize, the $M_{n,wap}$ equals zero before any APs have been assigned. The assignment need formula set forth above conveys the objective that at least one available AP at each location is essential, and that more APs at a given location are also desirable but provide diminishing returns. More APs at a given location is desirable, since AP transmit powers can then be reduced or receiver and Clear-Channel-Assessment sensitivity can be increased, thereby minimizing contention and collisions. In addition, by having more than one serving AP, the risk of losing coverage (or conversely, the risk of constraining APs to transmit at an inefficiently high power in order to preserve coverage) is diminished.

The term $\epsilon_n$ is primarily introduced to avoid divide-by-zero problems when $M_{n,wap}$=0. For instance, setting $\epsilon_n$, where n=u, to 0.001 helps to ensure that the underlay network is assigned APs in a manner that all locations can be serviced by the underlay network. $\epsilon_n$ can be configured to bias the selection algorithm to favor a given network service layer, such as to help guarantee that the overlay network achieves bare coverage (at least one AP) everywhere before the underlay network gets bare coverage everywhere. This could be achieved for instance by setting $\epsilon_o$ to 0.01, while setting $\epsilon_u$ to 0.00001, such that the overlay network almost certainly gets bare coverage everywhere first. An example of an exception is if there is one overlay WAP that needs a particular AP, whereas there are 101 underlay WAPs that need the same AP. In this case, the underlay network needs that AP more. The max(.) operator and the $\epsilon_n$<1 condition ensure that $\epsilon_n$ has no effect once $M_n$>=1 (i.e. after at least one AP is available at all networks and WAPs).

Given the foregoing, the assigning APs to different network service layers can be characterized as assigning APs that minimize the following cost function (CF):

$$CF = \sum_{n=1}^{All\_NSLs} \left[ \rho_n * \sum_{wap=1}^{Nwap} 1/\max(M_{n,wap}, \varepsilon_n) \right]$$

C.2. Greedy Assignment Algorithm

The process flow illustrated in FIG. 4 essentially effects a greedy assignment algorithm by which the access points are partitioned to the different network service layers (e.g., overlay and underlay networks). Furthermore, the process flow of FIG. 4 also operates to assign wireless access points in a manner that minimizes the cost function (CF) set forth above. As discussed above, at each iteration, wireless network management engine 10 selects a managed AP and assigns it to a given network service layer (in one implementation, either the underlay or overlay network). One skilled in the art will recognize that the selection and assignment functions described herein represent one of several possible implementations. A wide variety of selection functions can be used.

Still further, given the foregoing cost function, the GASMs iteratively computed for each access point and network service layer during execution of the partitioning algorithm are the sum of all the assignment need values (ANVs) for all locations (WAPs) covered by the MRSL area of that AP, In other words, wireless network management engine 10 computes an importance value or greedy algorithm selection metric (GASM) for each network service layer, given by:

$$GASM_{n,a} = \rho_n * \sum_{Cwap=1}^{All\_Cwaps} 1/\max(M_{n,Cwap}, \varepsilon_n), \text{ where}$$

Cwap are the locations (WAPs) within the MRSL area of $AP_a$. Thus, as FIG. 4 illustrates, the GA selection function is as follows: $GASM_{n,a}$ is calculated for all network service layers n and APs a. This list of $GASM_{n,a}$ values has some maximum value, at network $n_{max}$ and AP $a_{max}$. The AP $a_{max}$ is selected for the current iteration, and assigned to network $n_{max}$.

C.3. Optimizations

The partitioning algorithm may be optimized in a number of ways, depending on the specific implementation. For example, in one implementation, instead of recalculating $M_{n,wap}$ from scratch at each iteration, after AP $a_{max}$ is assigned to network $n_{max}$, the partitioning algorithm may increment the $M_{n,wap}$ of all locations (WAPs) visible to AP $a_{max}$ accordingly. In another implementation, instead of recalculating $GASM_{n,a}$ from scratch at each iteration, after AP $a_{max}$ is assigned to network $n_{max}$, the partitioning algorithm may only recalculate the $GASM_{n,a}$ of APs a that are visible to the WAPs within the MRSL area of AP $a_{max}$. With these optimizations, and assuming N APs, on average P WAPs per AP, and Q overlapped APs, the complexity of the algorithm may be $O(N(P+PQ^2+N))$ or $O(N^2)$ for large N. The initial factor N is for the N greedy algorithm iterations; the P term is for updating $M_{n,wap}$, the $PQ^2$ term is for finding the PQ APs affected by the assignment of AP $a_{max}$ and deleting duplicate APs in order to determine a unique list of approximately Q APs, and the final N term is for finding the maximum $GASM_{n,a}$ value.

C.4. Extension to More than Two Networks

The partitioning algorithm may extend to partition a set of APs into 3 or more network service layers and the specific number of networks will depend on a given implementation. As described above where the term "n" may represent both of the terms "o" (overlay network) and "u" (underlay network), the term "n" may similarly represent other terms (e.g., v, w, etc.) to represent other networks. Accordingly, $\rho_n$ may be defined for all n such that: Sum over {network n=o, u, v, . . . } $\rho_n$=1. The partitioning algorithm will attempt to allocate the number of APs to each network in proportion to $\rho_n$. Furthermore, $\epsilon_n$ is defined for all n. The ratio between the $\epsilon_n$s reflects the relative importance of bare coverage across the networks. For example, $\epsilon_n$=[0.0001 0.01 0.01] means that bare coverage is most important for the overlay network, and equally less important for the underlay networks u and v.

D. Central Management Server

Figure 7:
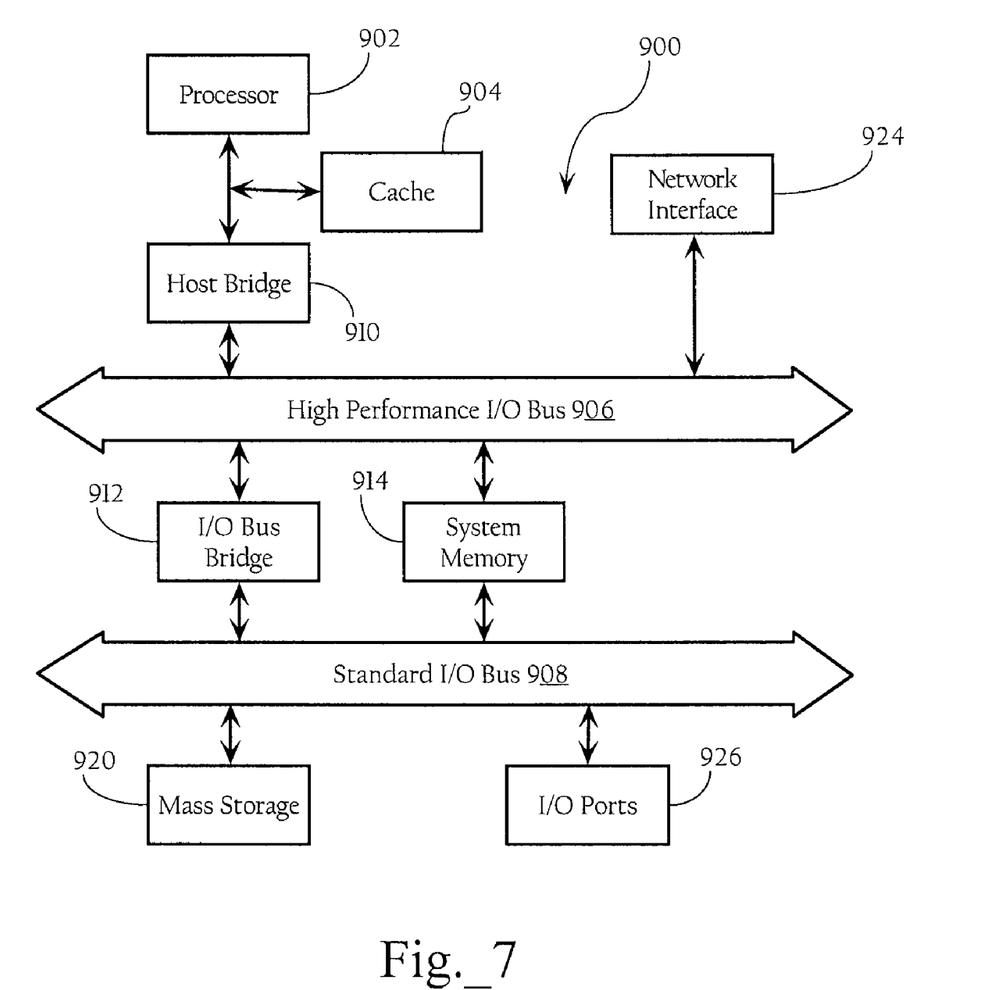
FIG. 7 is a functional block diagram illustrating the components of a wireless network management server in accordance with one embodiment of the present invention.

FIG. 7 illustrates for didactic purposes the WLAN management server 20 of FIG. 1. In one implementation, WLAN management server 20 comprises a processor 902, a system memory 914, a network interface 924, and one or more software applications (including the wireless network management engine 10 shown in FIG. 1) and drivers enabling the functions described herein. Furthermore, wireless network management engine 10, in one implementation, may comprise a Wireless LAN Solution Engine (WLSE) offered by Cisco Systems, Inc. of San Jose, Calif. As discussed in more detail below, wireless network management engine 10, in one implementation, includes various software modules that collect sensor and other data from the access points and compute various WLAN configuration parameters. In some implementations, wireless network management engine 10 employs an RF model of the WLAN deployment environment to compute one or more operational parameters for the APs 50. In some implementations, wireless network management engine 10 is also operative to coordinate various operations, performed by the access points 50, related to data gathering, such as switching to a common channel, and the transmission of packets between the access points in order to perform various RF location computations. The software modules may also include HTTP or other server functionality allowing network administrators to access wireless network management engine 10 from remote stations.

The present invention can be implemented on a wide variety of computer system architectures. For example, FIG. 7 illustrates, hardware system 900 having components suitable for central management server 20 in accordance with another implementation of the present invention. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interface 924 is used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the central management server 20 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

An operating system manages and controls the operation of system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

The invention has been explained with reference to specific embodiments. For example, while embodiments of the present invention have been described as operating in connection with IEEE 802.11 networks, the present invention can be used in connection with any WLAN environment. In addition, while the embodiments described above use a weighting value (ρ) to bias the partitioning of access points, the present invention can be used without a weighting factor. In addition, while the embodiments described above use SNMP to exchange data, other protocols can be used, such as XML, SOAP, TML1, and the like. Still further, the present invention may be embodied in a computer readable medium such as a CD-ROM, DVD-ROM or other suitable storage device including one or more software modules directed to the functionality described above. Still further, the software modules can be downloaded from a remote server and embodied in a carrier wave expressing data signals that when received by a remote device can be assembled into an installable software module. Other embodiments will be evident to those of ordinary skill in the art. It is therefore not intended that the invention be limited except as indicated by the appended claims.

What is claimed is:

1. A method for partitioning access points (APs) deployed in a region into two or more network service layers (NSLs), the method comprising:
computing, for each NSL, an assignment need value for each location of a desired set of locations in the region, the two or more NSLs comprising an overlay NSL and an underlay NSL, the overlay NSL corresponding to a first network service type provided by an overlay network, the underlay NSL corresponding to a second network service type provided by an underlay network, wherein said overlay network and said underlay network are separate and independent;
determining, for each AP, a selection metric for each NSL based on the assignment need values corresponding to each NSL and an effective coverage area associated with the each AP;
assigning the AP with the highest selection metric to the corresponding NSL; and
repeating the computing, determining, and assigning steps.

2. The method of claim 1 further comprising ranking the APs by the respective selection metrics across all NSLs.

3. The method of claim 1 wherein the assignment need value represents a need to assign an AP to a given location in a given NSL.

4. The method of claim 3 wherein the assignment need value computed for a given location and a given NSL decreases as the number of APs assigned to the given location increases.

5. The method of claim 1 wherein the computing the assignment need value is biased in favor of a selected NSL.

6. The method of claim 1 wherein the assignment need value is computed according the relationship:

$$ANV_{n,wap}=1/\max(M_{n,wap},\epsilon_n),$$

wherein $M_{n,wap}$ equals the number of APs assigned to a network service layer (n) whose minimum required signal level (MRSL) region covers a given location (wap), and wherein $\epsilon_n$ satisfies $0<\epsilon_n<1$.

7. The method of claim 6 wherein the $\epsilon_n$ for a given NSL is configured to bias the method in favor of the given NSL over at least one other NSL.

8. The method of claim 1 wherein the effective coverage area comprises the locations where a receive signal strength meets or exceeds a minimum threshold signal level.

9. The method of claim 1 wherein the selection metric is further based on an NSL proportion, wherein the NSL proportion is a desired ratio of APs assigned to a first NSL to APs assigned to a second NSL.

10. An apparatus for partitioning access points (APs) deployed in a region into two or more network service layers (NSLs), the apparatus comprising:
a network interface;
one or more processors;
a memory; and
a partitioning application, physically stored in the memory, comprising instructions operable to cause the one or more processors and the network interface to:
compute, for each NSL, an assignment need value for each location of a desired set of locations in the region, the two or more NSLs comprising an overlay NSL and an underlay NSL, the overlay NSL corresponding to a first network service type provided by an overlay network, the underlay NSL corresponding to a second network service type provided by an underlay network, wherein said overlay network and said underlay network are separate and independent;
determine, for each AP, a selection metric for each NSL based on the assignment need values corresponding to each NSL and an effective coverage area associated with the each AP;
assign the AP with the highest selection metric to the corresponding NSL; and
repeat the computing, determining, and assigning steps.

11. The apparatus of claim 10 wherein the partitioning application further comprises instructions operable to cause the one or more processors and the apparatus to
rank the APs by the respective selection metrics across all NSLs.

12. The apparatus of claim 10 wherein the assignment need value represents a need to assign an AP to a given location in a given NSL.

13. The apparatus of claim 12 wherein the assignment need value computed for a given location and a given NSL decreases as the number of APs assigned to the given location increases.

14. The apparatus of claim 10 wherein the computing the assignment need value is biased in favor of a selected NSL.

15. The apparatus of claim 10 wherein the assignment need value is computed according the relationship:

$$ANV_{n,wap}=1/\max(M_{n,wap},\epsilon_n),$$

wherein $M_{n,wap}$ equals the number of APs assigned to a network service layer (n) whose minimum required signal level (MRSL) region covers a given location (wap), and wherein $\epsilon_n$ satisfies $0<\epsilon_n<1$.

16. The apparatus of claim 15 wherein the $\epsilon_n$ for a given NSL is configured to bias the method in favor of the given NSL over at least one other NSL.

17. The apparatus of claim 10 wherein the effective coverage area comprises the locations where a receive signal strength meets or exceeds a minimum threshold signal level.

18. The apparatus of claim 10 wherein the selection metric is further based on an NSL proportion, wherein the NSL proportion is a desired ratio of APs assigned to a first NSL to APs assigned to a second NSL.

19. An apparatus for partitioning access points (APs) deployed in a region into two or more network service layers (NSLs), the apparatus comprising:
  means for computing, for each NSL, an assignment need value for each location of a desired set of locations in the region, the two or more NSLs comprising an overlay NSL and an underlay NSL, the overlay NSL corresponding to a first network service type provided by an overlay network, the underlay NSL corresponding to a second network service type provided by an underlay network, wherein said overlay network and said underlay network are separate and independent;
  means for determining, for each AP, a selection metric for each NSL based on the assignment need values corresponding to each NSL and an effective coverage area associated with the each AP;
  means for assigning the AP with the highest selection metric to the corresponding NSL; and
  means for repeating the computing, determining, and assigning steps.

20. The apparatus of claim 19 wherein the means for computing is configured to bias computing the assignment need values in favor of a selected NSL.

21. One or more non-transitory machine-readable storage media storing a computer program for partitioning access points (APs) deployed in a region into two or more network service layers (NSLs), comprising instructions operable to cause a programmable processor to:
  compute, for each NSL, an assignment need value for each location of a desired set of locations in the region, the two or more NSLs comprising an overlay NSL and an underlay NSL, the overlay NSL corresponding to a first network service type provided by an overlay network, the underlay NSL corresponding to a second network service type provided by an underlay network, wherein said overlay network and said underlay network are separate and independent;
  determine, for each AP, a selection metric for each NSL based on the assignment need values corresponding to each NSL and an effective coverage area associated with the each AP;
  assign the AP with the highest selection metric to the corresponding NSL; and
  repeat the computing, determining, and assigning steps.

22. The machine-readable storage media of claim 21 wherein the instructions are further operative to cause the programmable processor rank the APs by the respective selection metrics across all NSLs.

23. The machine-readable storage media of claim 21 wherein the assignment need value represents a need to assign an AP to a given location in a given NSL.

24. The machine-readable storage media of claim 23 wherein the assignment need value computed for a given location and a given NSL decreases as the number of APs assigned to the given location increases.

25. The machine-readable storage media of claim 21 wherein the computing the assignment need value is biased in favor of a selected NSL.

26. The machine-readable storage media of claim 21 wherein the assignment need value is computed according the relationship:

$$ANV_{n,wap} = 1/\max(M_{n,wap}, \epsilon_n),$$

wherein $M_{n,wap}$ equals the number of APs assigned to a network service layer (n) whose minimum required signal level (MRSL) region covers a given location (wap), and wherein $\epsilon_n$ satisfies $0 < \epsilon_n < 1$.

27. The machine-readable storage media of claim 26 wherein the $\epsilon_n$ for a given NSL is configured to bias the method in favor of the given NSL over at least one other NSL.

28. The machine-readable storage media of claim 21 wherein the effective coverage area comprises the locations where a receive signal strength meets or exceeds a minimum threshold signal level.

29. The machine-readable storage media of claim 21 wherein the selection metric is further based on an NSL proportion, wherein the NSL proportion is a desired ratio of APs assigned to a first NSL to APs assigned to a second NSL.

* * * * *